(12) United States Patent
Lai et al.

(10) Patent No.: US 7,334,927 B2
(45) Date of Patent: Feb. 26, 2008

(54) BACKLIGHT UNIT AND SUPPORTER WITHIN

(75) Inventors: Ching-Kun Lai, Chang Hua Hsien (TW); Kuang-Chou Lai, Chung Li (TW)

(73) Assignee: AU Optronics Corp., Hsinchu (TW)

( * ) Notice: Subject to any disclaimer, the term of this patent is extended or adjusted under 35 U.S.C. 154(b) by 19 days.

(21) Appl. No.: 11/133,186

(22) Filed: May 20, 2005

(65) Prior Publication Data

US 2005/0270795 A1 Dec. 8, 2005

(30) Foreign Application Priority Data

May 21, 2004 (TW) .............................. 93114383 A

(51) Int. Cl.
*F21V 99/00* (2006.01)
(52) U.S. Cl. ...................... 362/558; 362/561; 362/560
(58) Field of Classification Search ................ 362/558, 362/634, 560, 561, 511, 431, 260, 29, 30, 362/632; 349/64, 70
See application file for complete search history.

(56) References Cited

U.S. PATENT DOCUMENTS

| | | | | |
|---|---|---|---|---|
| 6,974,221 B2 * | 12/2005 | Wu et al. | ...................... | 362/29 |
| 2002/0044437 A1 * | 4/2002 | Lee | .............................. | 362/31 |
| 2004/0257792 A1 * | 12/2004 | Yu et al. | ........................ | 362/31 |

* cited by examiner

*Primary Examiner*—Sharon E. Payne
(74) *Attorney, Agent, or Firm*—Troxell Law Office, PLLC

(57) ABSTRACT

A backlight unit with a supporter is provided. The backlight unit at least comprises a bottom cover, a lamp, a diffuser and the supporter. The bottom cover has a first surface, a second surface opposite to the first surface and a hole formed on the bottom cover, through the first surface to the second surface. The lamp is disposed on the first surface of the bottom cover. The diffuser is disposed over the lamp. The supporter comprises a body, a pillar and a clip. The body of the supporter is disposed on the first surface of the bottom cover, for supporting the diffuser. The pillar is abutting to the body and protruding through the hole. The clip is disposed on the second surface for clamping the pillar.

18 Claims, 5 Drawing Sheets

BACKLIGHT UNIT AND SUPPORTER WITHIN

BACKGROUND OF THE INVENTION (1) Field of the Invention

The present invention generally relates to a backlight unit and particularly to a backlight unit with a supporter.

(2) Description of the Prior Art

Liquid Crystal Display (LCD), is previously applied in portable electronic product as notebook PC, cell phone, digital camera, digital video machine or Personal Digital Assistant (PDA). Lately, techniques of making larger sized LCD become matured. This affects the market of display products quite a lot. For example, the desktop-typed LCDs are replacing the traditional CRT monitors. The LCD TV takes advantage of its thinness and lightness to compete with the traditional TV product. Within a LCD, the liquid crystal panel (usually "panel" for short) is an elementary element of the whole device. But the liquid crystal panel does not generate light itself; a back light source is needed for providing light to the panel. Larger sized LCD, about 20" and larger, usually adopts direct-type backlight unit as its back light source.

Please refer to FIG. 1A. It illustrates a cross section view of a panel and a direct-type backlight unit. As described above, the panel 10 does not generate light itself. So the backlight unit 20 is disposed below the panel 10 to permit a user seeing images presented by panel 10 from top of panel 10.

The backlight unit 20 comprises a bottom cover 22, a plurality of lamp 24 and a diffuser 26. The bottom cover 22 comprises a substrate 221 and sidewalls 223 extending upward from margin areas of the substrate 221. The diffuser 26 is disposed on top of the sidewalls 223 and having a predetermined distance from the substrate 221. The plurality of lamp 24 is disposed between the diffuser 26 and the substrate 221. Each lamp 24 is arranged in a predetermined distance from each other. A light-reflecting material or a reflection sheet 28 is usually applied or disposed on the substrate 221, so as to enhance light-utilizing efficiency of the backlight unit 20.

Each lamp 24 arranged in said predetermined distance to each other is for spread evenly in the backlight unit 20, so as to providing lights of uniform intensity. In another prior art, a single lamp is formed in a curved shape, for example, U-shape (not shown) or W-shape (shown as numeral 24a in FIG. 1B), to achieve the requirement of light uniformity described above.

The diffuser 26 is made from light-transparent material like epoxy. Usually, a predetermined pattern is formed on the diffuser 26 to make light scattering within (diffuser 26). Thus, the backlight unit 20 could provide a more uniform light to the panel 10. This also prevents a user seeing the shape of the lamp 26 and being disturbed when watching the displayed images.

However, some problems are companioned with making larger sized LCDs. When the panel 10 and the backlight unit 20 become larger, a larger diffuser 26 is needed. The diffuser 26 is disposed on top of the sidewalls 223, so only the margin areas of the diffuser 26 are supported. Therefore, the weight of the larger, and also heavier, diffuser 26 would make itself bending at its central part (because of a downward force of gravity). This bending of the diffuser 26 would change its original optical design and defeat the light uniformity. Besides, assemble quality between sidewalls 223 and diffuser 26 may also be defeated because of said weight and bending of diffuser 26. The combination portion of sidewall 223 and diffuser 26 would be loosened or unbound, or even worse, some part of diffuser 26 may be broken.

For the reason described above, a plurality of supporter is adopted between the diffuser 26 and the substrate 221 of the bottom cover 22 to enhance the assemble quality of the backlight unit 20. Typical prior arts about supporter are described below.

Please refer to FIG. 2. FIG. 2 illustrates a cross section view of a typical supporter. Generally, supporter 30 is designed into a cone shape. The cone-shaped supporter 30 has a top end with a smaller cross-section radius L1 and a bottom end with a larger cross-section radius L2. The top end contacts with the diffuser 26, so light could not enter the diffuser 26 in the contact area. The smaller cross-section radius L1 is for minimizing the contact area, so as to prevent an obvious "dark point" occurred in the backlight unit 20. But the supporter 30 is fixed with the substrate 221 by a screw 32, the bottom end with a larger cross-section radius L2 is therefore needed.

However, the prior art described above with FIG. 2 needs an artificial process to assemble the supporter 30 by the screw 32. And there is no automation apparatus for this assemble process hereto, even there is, extra cost would generate. Thus, another prior art is adopted to shorten the artificial process.

Please refer to FIG. 3. FIG. 3 illustrates a cross section view of another prior supporter. Similar to FIG. 2, The supporter 40 has a top end with a smaller cross-section radius L1 and a bottom end with a larger cross-section radius L3. The difference is that the supporter 40 further comprises a column 402, a spring 404 and an anchor 406. The column 402 extends downward from the bottom end of supporter 40. The anchor 406 connects to the bottom of the column 402. The spring 404 surrounds the column 402. As shown in FIG. 3, spring 404 and anchor 406 are separately located at the different sides of the substrate 221 to clip it between. A ring 42 could also be adopted at the side of anchor 406 to enhance the clipping performance. Within, the anchor 406 is shrinkable when passing through the hole of the substrate 221, once and irreversible. While assembling, disposing the ring 42 on the bottom surface of the substrate 221, then only a simple plugging action is needed.

Although the prior supporter 40 shown in FIG. 3 is much easier to be assembled, however, the spring 404 limits its supporting ability. When an external force, which is larger than the elastic force of the spring 404, applies to the diffuser 26, the supporter 40 would slide within a distance (symbol "d" in FIG. 3). Besides, once the spring 40 becomes tired, the supporting ability may entirely lose.

Beside the remaining disadvantages of the described prior arts of FIG. 2 and FIG. 3, they have another common drawback. That is, although the supporter 30 or 40 is designed into a cone shape to minimize the contact area with the diffuser 26. The bottom end of supporter 30 or 40 still prevents the contact portion of reflection sheet 28 reflecting light upward. Comparing to other portion of reflection sheet 28, which is not contact with supporter 30 or 40, the contact portion would have relatively weaker brightness and become a "shadow point" of the backlight unit 20.

SUMMARY OF THE INVENTION

It is therefore an objective of the present invention to provide a backlight unit with a supporter to solve the above mentioned disadvantages and drawbacks.

In a preferred embodiment, the present invention provides a backlight unit with at least one supporter is provided. The backlight unit at least comprises a bottom cover, a lamp, a diffuser and the supporter.

The bottom cover has a first surface, a second surface opposite to the first surface and a hole formed on the bottom cover, through the first surface to the second surface. The lamp is disposed over the first surface of the bottom cover. The diffuser is disposed over the lamp. The supporter comprises a body, a pillar and a clip. The body of the supporter is disposed on the first surface of the bottom cover, for supporting the diffuser. The pillar is abutting to the body and protruding through the hole. The clip is disposed on the second surface for clamping the pillar.

The present supporter comprises a body of particular optical design. The body comprises a cone and a plate. The cone, which has a first inclined surface, supports the diffuser. The plate, which has a second inclined surface, abuts to the cone. Within the backlight unit, light is reflected successively through the second inclined surface and the first inclined surface. Then, the light would reach a portion of the diffuser, which is right above the plate. By this optical design, the prior drawback of "shadow point" is greatly improved.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 4A:
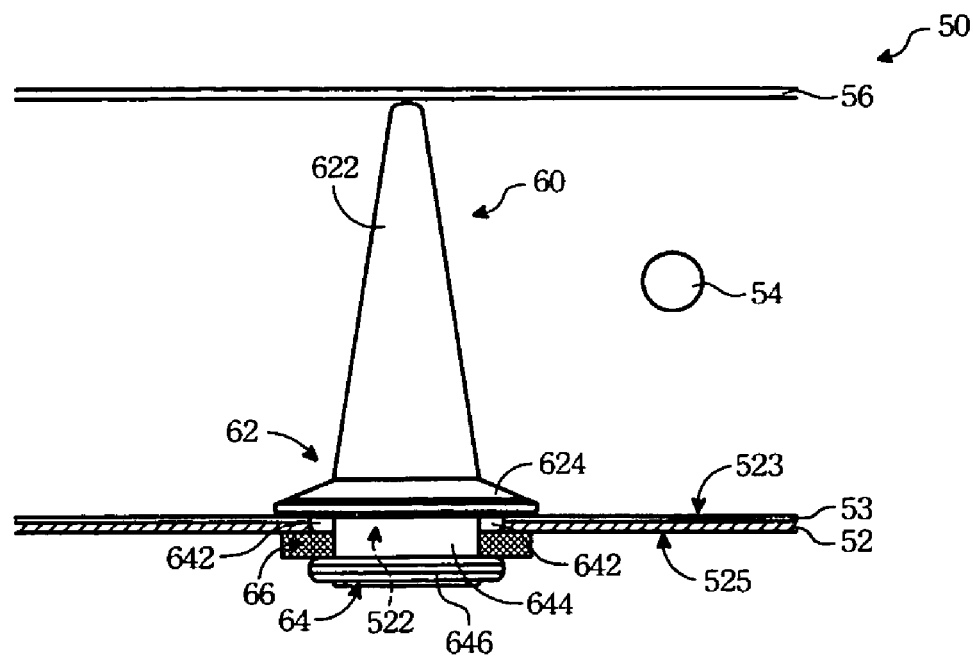
FIG. 4A is a cross section view of a backlight unit according to the present invention.

Please refer to FIG. 4A. FIG. 4A is a cross section view of a backlight unit according to the present invention. The backlight unit 50 comprises a bottom cover 52, a lamp 54, a diffuser 56 and a supporter 60.

The bottom cover 52 has a first surface 523, a second surface 525 opposite to the first surface 523 and a hole 522 formed on the bottom cover 52, through the first surface 523 to the second surface 525. The lamp 54 is disposed over the first surface 523 of the bottom cover 52. The diffuser 56 is disposed over the lamp 54. The supporter 60 comprises a body 62, a pillar 64 and a clip 66. The body 62 is disposed on the first surface 523, for supporting the diffuser 56. The pillar 64 is abutting to the body 62 and protruding through the hole 522. The clip 66 is disposed on the second surface 525 for clamping the pillar 64. In a preferred embodiment, the backlight unit 50 further comprises a reflection sheet 53, disposed on the first surface 523.

The supporter 60 comprises a body 62, a pillar 64 and a clip 66. The body 62 is disposed on the first surface 523 of the bottom cover 52, for supporting the diffuser 56. The pillar 60 is abutting to the body 62 and protruding through the hole 522. The clip 66 is disposed on the second surface 525 for clamping the pillar 64. Within the backlight unit 50, the bottom cover 52 is clamped by the body 60 and the clip 66, by this, the supporter 60 could be fixed with the bottom cover 52.

Figure 4B:
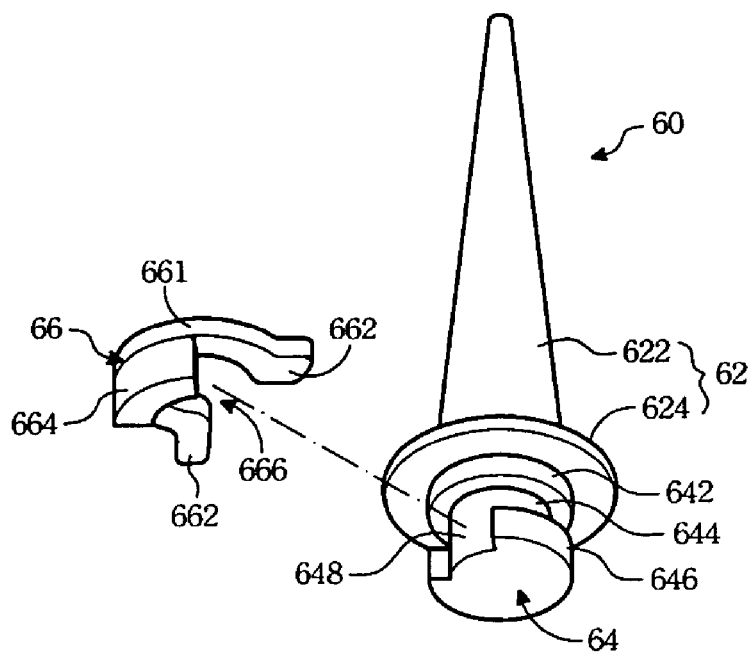
FIG. 4B is an explosive diagram of the supporter of FIG. 4A.

Please refer to FIG. 4B. FIG. 4B is an explosive diagram of the supporter of FIG. 4A. As shown in the figure, the pillar 64 comprises a first portion 646 and a second portion 644. After assembling (shown as FIG. 4A), the first portion 646 would be disposed above the second surface 525 of the bottom cover 52. The second portion 644 would connect the first portion 646 and the body 62 while extending through the hole 522. Wherein, the cross-section radius of the second portion 644 is smaller than the cross-section radius of the first portion 646. That is, the second portion 644 is thinner than first portion 646. The clip 66 clamps the pillar 64 by the thinner second portion 644 and is limited by the thicker first portion 646.

Figure 4C:
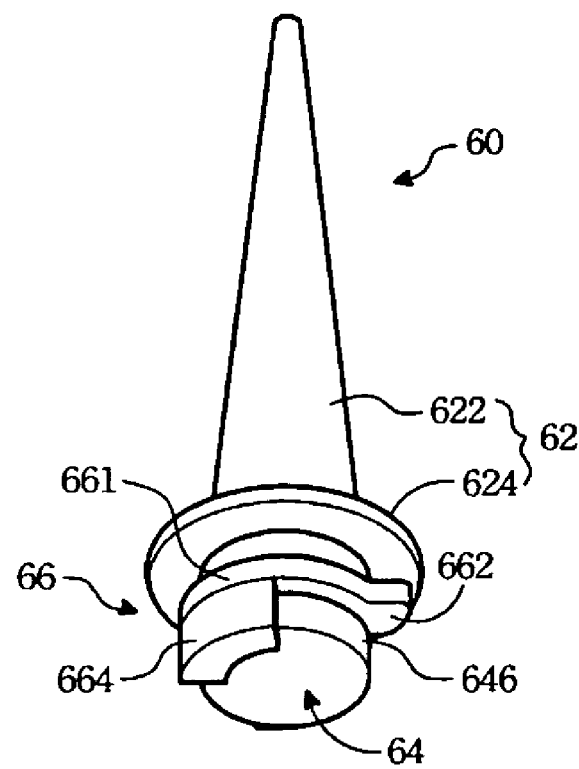
FIG. 4C illustrates the assembled situation of the supporter of FIG. 4B.

The third portion 646 is disposed in the hole 522 and outside the second portion 646. Preferably, the thickness of the third portion 642 of the pillar 64 is substantially equal to the radius of the hole 522. The cross-section radius of the pillar 64 corresponding to the third portion 646 is substantially equal to the radius of the hole 522. FIG. 4C illustrates the assembled situation of the clip 66 and the pillar 64 in this embodiment.

As shown in FIG. 4B, the clip 66 is of "Ω" shape with an opening 666. The clip 66 comprises a clip body 661 and two arms 662. While assembling, the clip 66 is assembled with the pillar 64 from side of it. The second portion 644 of the pillar 64 firstly encounters the two arms 662 so as to enlarge the opening 666. Then, the clip body 661 is able to surround the second portion 644. In other words, the clip 66 holds or clamps the second portion 644 of the pillar 64. Once the clip 66 and the pillar 64 are assembled together, they could be separated only by external force applying to the clip, which enlarges the opening 666 again.

Figure 4D:
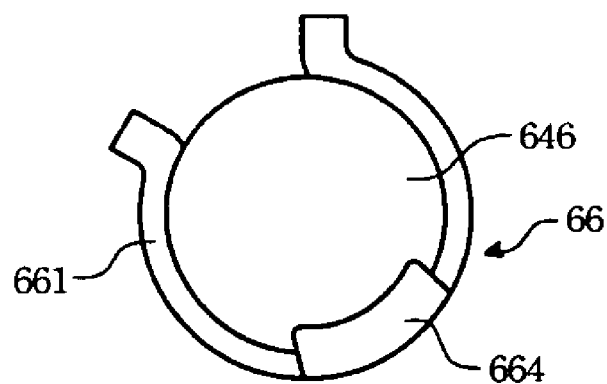
FIG. 4D is a bottom view of the supporter of FIG. 4C.

In one embodiment of the present invention, the backlight unit 50 further comprises a convex-concave structure (shown as numeral 664 and 648 in FIG. 4B), which is disposed between the clip 66 and the pillar 64. The convex 664 is an extension portion extending downward from the clip body 661. Correspondingly, the concave 648 is formed on the first portion 646 of the pillar 64. As shown in FIG. 4C and FIG. 4D, the concave 648 contains the convex 664 so as to avoid the clip 66 being rotatable around the pillar 64.

Figure 1A:
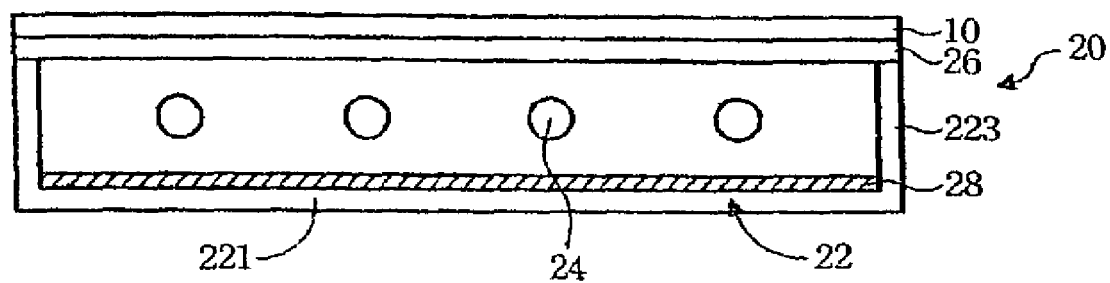
FIG. 1A is a cross section view of a panel and a backlight unit of related art.
Figure 1B:
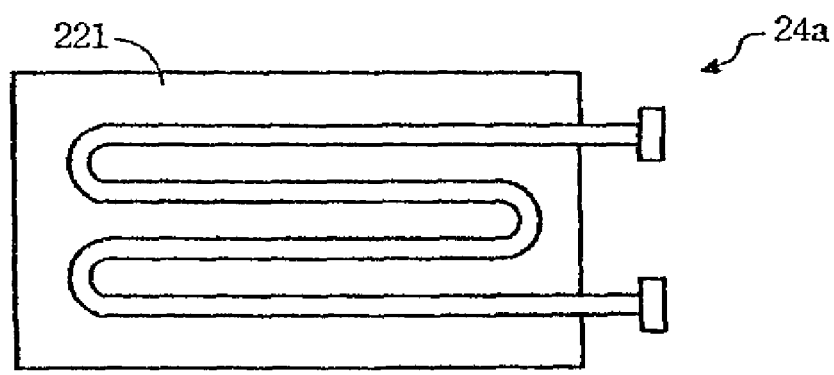
FIG. 1B is a top view of a W-shape lamp of related art.
Figure 2:
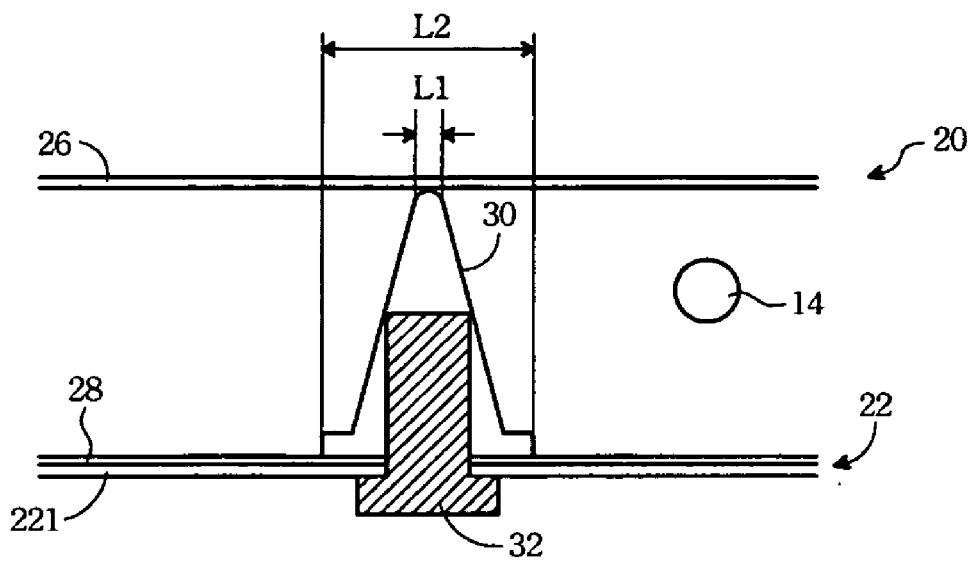
FIG. 2 is a cross section view of a bottom lighting module corresponding to a prior art.
Figure 3:
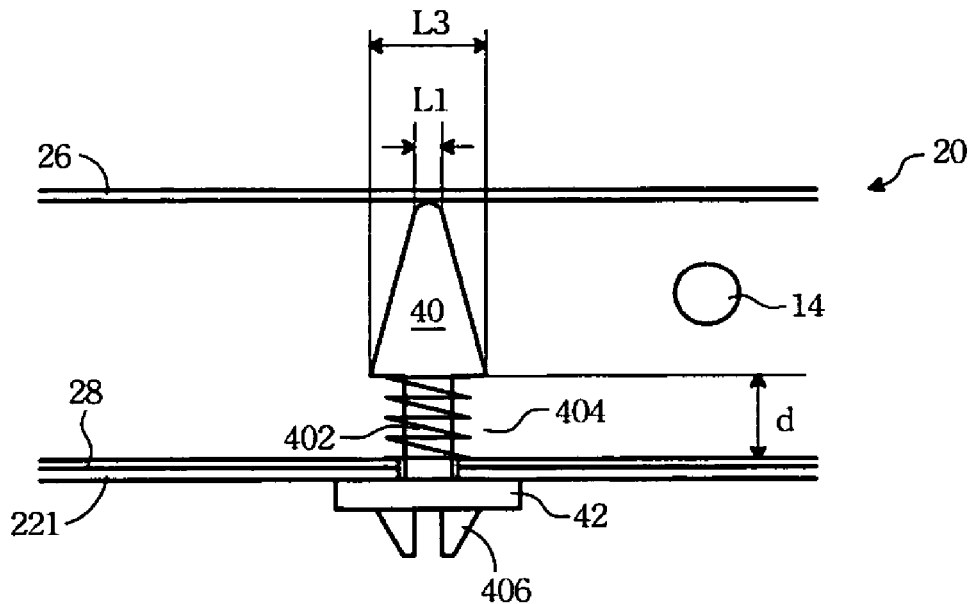
FIG. 3 is a cross section view of a backlight unit corresponding to another prior art.
Figure 4E:
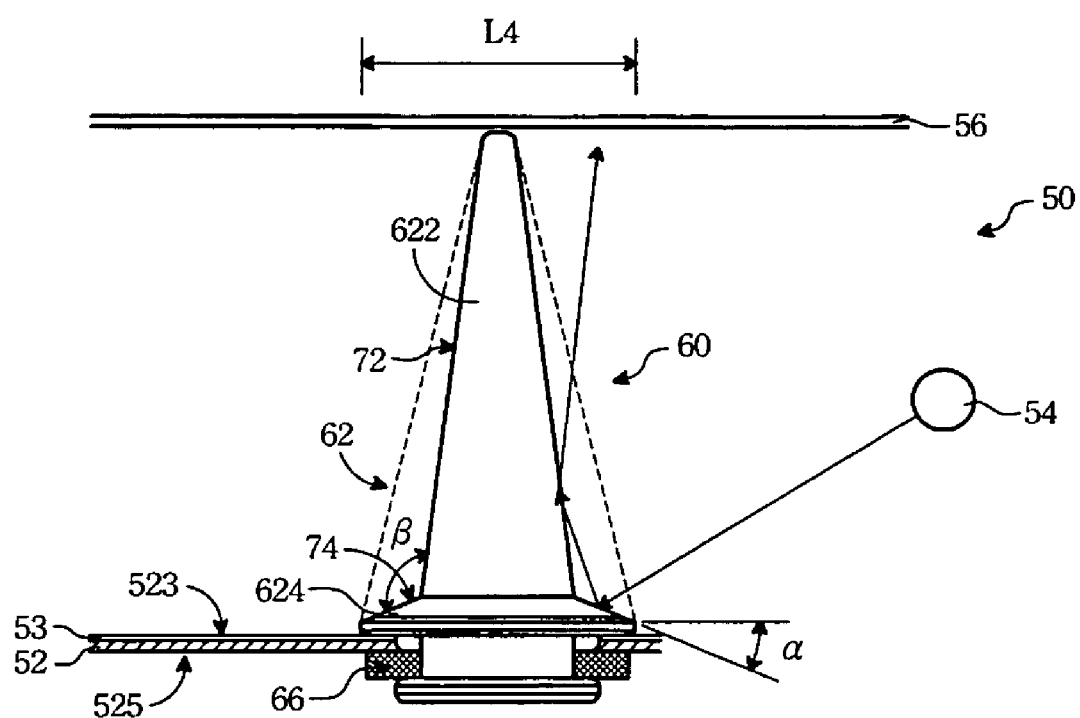
FIG. 4E illustrates the light path corresponding to the optical design of the present invention.

The present invention needs no screw to assemble the supporter 60. The structure of the pillar 64 and the body 62 is able to be maid in integral by processes like injection molding. So its size could be further minimized than the prior art shown in FIG. 2. As shown in FIG. 4E, the bottom end of the body 62 having a section radius L4, which is smaller than the section radius L2 shown in FIG. 2. Hence, the contact area of the reflection sheet 53 with the supporter 60 is smaller than prior arts. The "shadow point" is minimized therefore.

Besides, please refer to FIG. 4E, the present supporter 60 comprises a body 62 of particular optical design. The body 62 comprises a cone 622 and a plate 624. The cone 622, which has a first inclined surface 72, supports the diffuser 56. The plate 624, which has a second inclined surface 74, abuts to the cone 622. Within the backlight unit 50, light is reflected successively through the second inclined surface 624 and the first inclined surface 622. Then, the light would reach a portion of the diffuser 56, which is right above the plate 624. Said portion of diffuser 56 is also corresponding to the cross section distance L4 shown in FIG. 4E. By this optical design of body 62, the prior drawback of "shadow point" is greatly improved. In preferred embodiments, the angle (shown as "α" in FIG. 4E) between the second inclined surface 74 and the bottom cover 52 is about 5 degrees to 30 degrees. And the angle (shown as "β" in FIG. 4E) between the first inclined surface 72 and the second inclined surface 74 is about 100 degrees to 120 degrees.

To sum up, the present invention provides a supporter of a backlight unit, which is quite easy to be assembled. Even in artificial condition, no screw or other tools is needed. Procedure and timing-cost for assembling the backlight unit are both saved. Besides, the present supporter is fixed quite rigidly with the bottom cover in both vertical and horizontal directions. There is also no prior disadvantage as material-tiring should be concerned in the present invention. So a backlight unit with a solid and steady assemble quality is provided. Further more, the optical design within the present invention provides a total solution to the "shadow point", which seems irreparable among prior arts. Therefore, the present invention provides a backlight unit, which has an improved even brightness.

While the present invention has been particularly shown and described with reference to a preferred embodiment, it will be understood by those skilled in the art that various changes in form and detail may be without departing from the spirit and scope of the present invention.

We claim:

1. A supporter of a backlight unit, said backlight unit comprising a bottom cover, a lamp, a diffuser and the supporter, the bottom cover having a first surface, a second surface opposite to the first surface and a hole formed on the bottom cover, through the first surface to the second surface, the lamp disposed over the first surface, the diffuser disposed over the lamp, the supporter comprising:
   a body, disposed on the first surface of the bottom cover, for supporting the diffuser;
   a pillar abutting to the body and protruding through the hole; and
   a clip disposed on the second surface for clamping the pillar, being of an "Ω" shape comprising a clip body and two arms.

2. The supporter of claim 1, wherein the body comprises:
   a cone having a first inclined surface and supporting the diffuser; and
   a plate having a second inclined surface abutting to the cone.

3. The supporter of claim 1, wherein the pillar comprises:
   a first portion above the second surface of the bottom cover; and
   a second portion connected the first portion and the body while extending through the hole.

4. The supporter of claim 3, wherein the cross-section radius of the second portion is smaller than the cross-section radius of the first portion.

5. The supporter of claim 1, further comprising a convex-concave structure disposed between the clip and the pillar.

6. The supporter of claim 2, wherein the angle between the second inclined surface and the bottom cover is about 5 degrees to about 30 degrees.

7. The supporter of claim 2, wherein the angle between the first inclined surface and the second inclined surface is about 100 degrees to 120 degrees.

8. The supporter of claim 1, wherein the pillar comprises:
   a first portion above the second surface of the bottom cover;
   a second portion connected the first portion and the body while extending through the hole, wherein the cross-section radius of the second portion is smaller than the cross-section radius of the first portion; and
   a third portion disposed in the hole and outside the second portion.

9. The supporter of claim 8, wherein the thickness of the third portion of the pillar is substantially equal to the thickness of the bottom cover.

10. The supporter of claim 8, wherein the cross-section radius of the pillar corresponding to the third portion is substantially equal to the radius of the hole.

11. A backlight unit, comprising:
    a bottom cover having a first surface, a second surface opposite to the first surface, and a hole formed on the bottom cover, through the first surface to the second surface;
    a lamp disposed over the first surface;
    a diffuser disposed over the lamp; and
    a supporter, comprising:
       a body, disposed on the first surface of the bottom cover, for supporting the diffuser;
       a pillar abutting to the body and protruding through the hole; and
       a clip disposed on the second surface for clamping the pillar, being of an "Ω" shape comprising a clip body and two arms.

12. The backlight unit of claim 11, wherein the body comprises:
    a cone having a first inclined surface and supporting the diffuser; and a plate having a second inclined surface abutting to the cone.

13. The backlight unit of claim 11, wherein the pillar comprises:
    a first portion above the second surface of the bottom cover; and
    a second portion connected the first portion and the body while extending through the hole, wherein the cross-section radius of the second portion is smaller than the cross-section radius of the first portion.

14. The backlight unit of claim 11, further comprising a convex-concave structure disposed between the clip and the pillar.

15. The backlight unit of claim 12, wherein the angle between the second inclined surface and the bottom cover is about 5 degrees to about 30 degrees.

16. The backlight unit of claim 12, wherein the angle between the first inclined surface and the second inclined surface is about 100 degrees to about 120 degrees.

17. The backlight unit of claim 11, wherein the pillar comprises:
    a first portion above the second surface of the bottom cover;
    a second portion connected the first portion and the body through the hole, wherein the cross-section radius of the second portion is smaller than the cross-section radius of the first portion; and
    a third portion disposed in the hole and outside the second portion.

18. The backlight unit of claim 17, wherein the cross-section radius the pillar corresponding to third portion is substantially equal to the radius of the hole.

* * * * *